United States Patent [19]

Sparling et al.

[11] Patent Number: 4,749,323
[45] Date of Patent: Jun. 7, 1988

[54] HOLE EXPANDING RIVET WITH A SHADED TAIL

[75] Inventors: Kenneth P. Sparling; David G. Richardson, both of Burbank; Angelo Incardona, Huntington Beach; Ronald E. Wood, Sepulveda; Garth D. Kikendall, Highland Park; Leon Bakow, Sherman Oaks, all of Calif.

[73] Assignee: Lockheed Corporation, Calabasas, Calif.

[21] Appl. No.: 803,749

[22] Filed: Dec. 2, 1985

[51] Int. Cl.$^4$ .............................................. F16B 19/06
[52] U.S. Cl. ................................ 411/507; 29/522 A; 29/526 H
[58] Field of Search .................. 411/507, 500–506; 29/509, 522 A, 526 H

[56] References Cited

U.S. PATENT DOCUMENTS

| | | |
|---|---|---|
| 1,457,008 | 10/1919 | Smith . |
| 1,480,485 | 2/1923 | Yonce . |
| 1,966,401 | 5/1931 | Andren ................................. 85/37 |
| 2,237,338 | 4/1941 | Dale .................................... 411/501 |
| 3,516,699 | 2/1969 | Bergere ......................... 287/189.36 |
| 3,561,102 | 2/1971 | Diemer ........................... 411/507 X |
| 3,680,429 | 3/1970 | Briles .................................... 85/37 |
| 4,004,484 | 1/1977 | Speakman ........................... 411/507 |
| 4,051,592 | 10/1977 | Briles ............................ 411/507 X |

FOREIGN PATENT DOCUMENTS 679962 8/1939 Fed. Rep. of Germany .

Primary Examiner—Gary L. Smith
Assistant Examiner—Lloyd A. Gall
Attorney, Agent, or Firm—Louis L. Dachs

[57] ABSTRACT

The invention is a tapered tail rivet for joining two or more structural elements together which, during driving, provides a controlled expansion of the hole and, after driving, leaves residul hoop compression stresses around the hole. The tapered tail rivet has a shank having a nominal diameter (the diameter in the middle of the tolerance range). The head diameter may be of the type critically dimensioned based on the shank diameter or other design parameter. The tapered tail length is between 1.30 times the minimum shank diameter and 1.10 times the maximum shank diameter. The distal end of the tapered tail has a diameter of between 0.80 times the minimum shank diameter and 0.68 times the maximum shank diameter. The tapered tail portion should extend to the face of one of the structural elements to just inside the face of that structural element prior to driving. The minimum upset tail diameter should be 1.45 times the nominal shank diameter and the minimum upset tail height should be 0.30 times the nominal shank diameter.

4 Claims, 1 Drawing Sheet

HOLE EXPANDING RIVET WITH A SHADED TAIL

TECHNICAL FIELD

The invention relates to the field of fasteners and, in particular, to a rivet having an improved fatigue life.

BACKGROUND INFORMATION

Rivets are probably the oldest and most widely used fastener in industry. They are inexpensive to manufacture, do not require close tolerance holes, and are easily installed. Riveted structures usually have an extended service (fatigue) life because of the hole-filling characteristics of the rivet. When rivets are driven, the rivet shank expands and tends to fill the hole. This eliminates relative movement between the joined structural members, thus, providing the extended fatigue life.

Another type of fatigue life extending fastener is the interference fit pin. The interference fit is sufficient to put residual hoop tension stresses around the hole which enhances the fatigue life of structures thus joined. These pins are expensive and require very close-tolerance holes and, therefore, are expensive to install. One such fastener is the Hi-Tigue pin, manufactured by the Hi-Shear Corporation, Torrance, Calif.

However, it is more desirable to place residual hoop-compression stresses around the hole. One technique to accomplish this, which has been developed by the Fatigue Technology Corporation, Seattle, Wash., is to expand the hole with a removable sleeve and mandrel. The mandrel, while it is being pulled through the hole, stresses the material around the hole beyond the proportional limit in hoop tension. Thus, when the mandrel is removed, the material around the hole recovers elastically and forms local residual hoop-compression stresses around the hole. Thereafter a fastener is installed in the hole. The additional hole preparation step significantly increases manufacturing costs.

Various rivet designs have been proposed and developed to obtain better control of the filling of the hole when driving. For example, F. S. Briles in U.S. Pat. 3,680,429 discloses a "Self-Gauging, Interference Fit Rivet". The rivet design includes a shank portion having along its length a sequence of progressively reduced diameter sections. When inserting the rivet in a hole, the smallest section freely passes therethrough, while the largest section adjacent to the head requires forced insertion as a result of the interference fit with the hole. In this way the hole is prestressed around the larger section of the rivet. There appears to be no disclosure of expanding the hole to improve the fatigue life.

In the above discussion no attempt has, been made to make all critical dimensions of the head and tail, before and after driving, of the rivet, a function of the shank diameter. Requiring that the critical dimensions be a ratio of the shank diameter makes the design of any rivet with a particular shank diameter easy to accomplish. While in most cases standard rivet sizes will suffice, there are instances where special diameters (inch-to-metric conversions, etc.) are required. Thus, a rivet having all the critical dimensions based on the shank diameter would minimize design and test time required to insure that the necessary static tension, shear strengths, and fatigue life are achieved.

Applicants' co-pending applications, Ser. No. 657,700, "Controlled Expansion Protuding-Head Rivet Design", filed 10/3/84, Ser. No. 657,300, "Controlled Expansion Flush-Head Rivet Design", filed Oct. 4, 1984 and Ser. No. 676,464, "Controlled Expansion Flush-Head Rivet" filed Nov. 29, 1984, all disclose rivets using both the concept of controlled hole expansion and of having critical dimensions based on the shank diameter.

Additional patents of interest are as follows: U.S. Pat. Nos. 1,480,485, "Rivet" by K. G. Yonce; 3,516,699, "Tapered Rivet" by E. W. Bergere; 1,457,008, "Self Anchoring Rivet" by Smith; 1,966,40 "Rivet" by B. T. Andren, and German Pat. No. 679,962.

Therefore, it is a primary object to provide a rivet that, after driving, obtains controlled expansion of the hole, placing residual hoop-compression stresses in the hole wall, thereby increasing the fatigue life.

It is another object of the subject invention to provide a rivet wherein all critical dimensions thereof are ratios of the shank diameter.

It is another object of the subject invention to retard the formation of the bucked tail to allow more rivet tail material to be pushed into the hole before the bucked tail expansion occurs.

A further object of the subject invention is to provide a rivet that can be installed and driven with or without tank sealant or primer.

DISCLOSURE OF THE INVENTION

The invention is a tapered tail rivet for joining two or more structural elements together which, during driving, provides a controlled expansion of the hole and, after driving, leaves residual hoop compression stresses around the hole. The tapered tail rivet has a shank having a nominal diameter (the diameter in the middle of the tolerance range). The head diameter may be of the type critically dimensioned based on the shank diameter or other design parameter. The tapered tail length is between 1.30 times the minimum shank diameter and 1.10 times the maximum shank diameter. The distal end of the tapered tail has a diameter of between 0.80 times the minimum shank diameter and 0.68 times the maximum shank diameter. The tapered tail portion should extend to the face of one of the structural elements to just inside the face of that structural element prior to driving. The minimum upset tail diameter should be 1.45 times the nominal shank diameter and the minimum upset tail height should be 0.30 times the nominal shank diameter.

The novel features which are believed to be characteristic to the invention, both as to its organization and method of operation, together with further objects and advantages thereof, will be better understood from the following description connected with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side view of the tapered tail rivet.

Illustrated in FIG. 2 is a cross-sectional view of the undriven rivet installed in a structure.

Figures 2, 3:
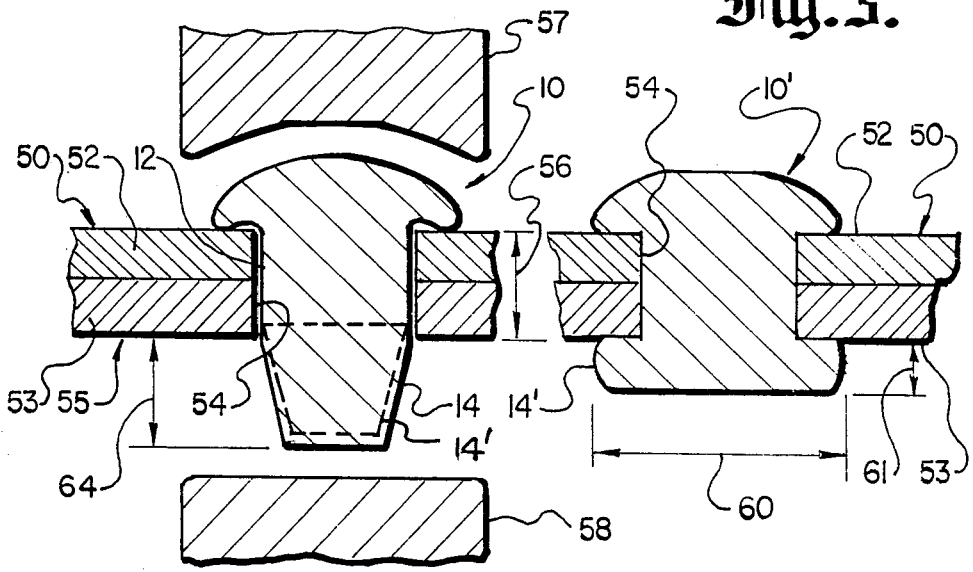

Illustrated in FIG. 3 is a cross-sectional view of the rivet driven in place in the structure shown in FIG. 2.

BEST MODE FOR CARRYING OUT THE INVENTION

Figure 1:
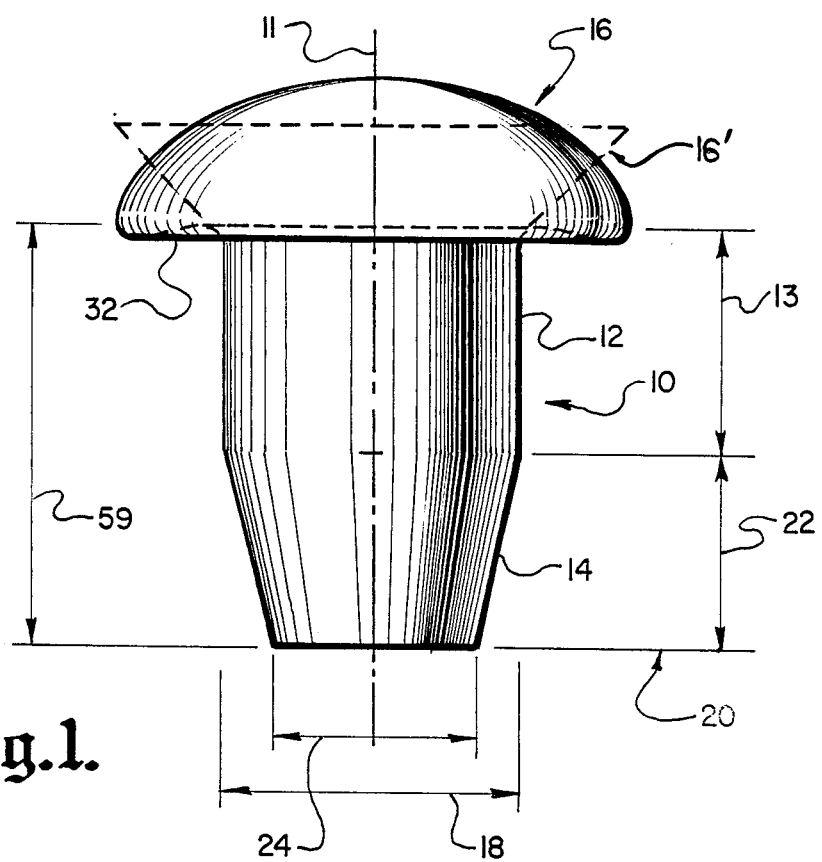

Referring to FIG. 1, it can be seen that the rivet, generally designated by numeral 10, has a longitudinal axis 11, a shank portion 12 having a length 13, a conically tapered tail portion 14 and a protruding head 16. Alternately, the rivet can have a flush-head indicated in dotted lines and by numeral 16'. The rivet can be of the type having its critical dimensions based on the shank diameter, such as applicants' co-pending applications Ser. No. 657,700, "Controlled Expansion Protruding-Head Rivet Design", Ser. No. 657,300 "Controlled Expansion Flush-Head Rivet Design" and Ser. No. 676,464, "Controlled Expansion Flush-Head Rivet". The shank portion 12 has a diameter, indicated by numeral 18. The nominal shank diameter is the diameter in the middle of the tolerance range (between the maximum and minimum allowable shank diameter dimensions).

The plane formed by the intersection of the shank portion 12 with the tapered tail portion 14 is indicated by numeral 20. The tapered tail length is between 1.30 times the minimum shank diameter and 1.10 times the maximum shank diameter. The distal end of the tapered tail has a diameter of between 0.80 times the minimum shank diameter and 0.68 times the maximum shank diameter.

Illustrated in FIG. 2 is a structure 50 including plates 52 and 53 having a hole 54 drilled therethrough. The rivet 10 is shown installed in the hole 54 prior to driving. The hole 54 should have a diameter slightly less than the minimum drill diameter. Ideally, this would be a "line-to-line" fit where the maximum shank diameter equals the minimum hole diameter. The maximum hole diameter should be 1.05 times the minimum shank diameter 18. The length of the shank portion 13 should be selected such that with the rivet installed in the hole 54 the tapered tail portion 14, prior to driving, extends at least to the face 55 of plate 53, as illustrated in solid lines to one-third the depth of plates 52 and 53 as indicated in dotted lines and numeral 14'. This can be achieved by proper selection of length 13 of the shank 12 which is sized taking into consideration the tolerances of the combined thickness of plates 52 and 53, indicated by numeral 56.

The rivet 10 is driven by conventional driving equipment currently used to drive existing rivets, such as rivet set 57 used in conjunction with a conventional bucking bar 58 (only partially shown). One of the advantages of this rivet design is that these standard driving tools can be used to install the rivet in holes produced by standard twist drills.

Illustrated in FIG. 3 is the rivet designated by numeral 10', installed and driven in the structure 50. When properly driven, the upset tail 14' and a portion of the head 16 expands into the hole 54 and puts residual compressing stress in the hole 54. This greatly improves the fatigue life of the joined structure 50. The superior static shear strength, tension strength, and fatigue life can be obtained when the grip or thickness of the parts to be joined is less than 2.5 times the shank diameter 18.

Still referring to FIGS. 1–3, the combined length 59 of the shank 12 and tail 14 must be selected so that the after-driving tail diameter 60 and tail height 61 (FIG. 3) are a minimum of 1.45 times the nominal shank diameter and a minimum of 0.30 times the nominal shank diameter respectively.

TEST RESULTS

Fatigue tests were run on lap shear test specimens made of 2024-T3 and 7075-T6 clad aluminum alloy joined by rivets made in accordance with Military Standard icebox rivets MS20426DD and MS20470DD and with the teachings of the previously mentioned co-pending patent applications, Ser. Nos. 657,300 and 657,700 by Applicants made from 7050-T73 aluminum alloy (identified as MR2220FCE6 and MR2220PAE8, respectively) and similar rivets modified to the tapered tail configuration per the teachings of this invention. Both ¼ inch and 3/16 inch diameter rivets were tested at loads of 7,000 and 10,000 psi, respectively. The rivets were hand buck (HB) installed and automatic machine squeeze (auto) installed. The results of the fatigue tests are illustrated in Table I and II. These tests show the subject rivets to be superior to the non-tapered tail MS20426DD, MS20470DD, MR2220FCE and MR2220PAE rivets.

TABLE I
FATIGUE LIFE OF ¼ INCH PROTRUDING HEAD RIVETS

| Rivet Number | Installation | Load (ksi) | Cycles[2] |
|---|---|---|---|
| MS20470DD | AUTO[1] | 7 | 423,000 |
| MR2220PAE | AUTO | 7 | 524,000 |
| MR2220PAE (with minimum tapered tail) | AUTO | 7 | 592,000 |
| MR2220PAE (with maximum tapered tail) | AUTO | 7 | 629,000 |

[1]Automatic machine squeeze.
[2]Represents geometric mean fatigue life for five specimens in each group.

TABLE II
FATIGUE LIFE OF 3/16 INCH FLUSH HEAD RIVETS

| Rivet Number | Installation | Load (ksi) | Cycles[1] |
|---|---|---|---|
| MS20426DD | HB[2] | 10 | 127,000 |
| MR2220FCE | HB | 10 | 286,000 |
| MR2220FCE (with minimum tapered tail) | HB | 10 | 306,000 |
| MR20426DD | AUTO[3] | 10 | 80,000 |
| MR2220FCE | AUTO | 10 | 388,000 |
| MR2220FCE (with maximum tapered tail) | AUTO | 10 | 467,000 |

[1]Represents the geometric mean fatigue life for four specimens in each group.
[2]Hand buck.
[3]Automatic machine squeezed.

The increased performance of the tapered tail rivet is believed to be primarily due to the fact that upon initial driving, but prior to significant deformation, a sufficient amount of tail material flows into the shank causing the hole diameter to expand putting residual hoop compression stresses around the rivet hole. That is, the material around the hole is subjected to high hoop-tension loads that stresses the sheet material into the plastic range and, when the driving forces are removed, leaves residual hoop-compression stresses around the hole next to the rivet. The rivet head and tail are sized so that the volume of rivet material driven is limited so that, using the standard rivet sets and bucking bars, it is not possible to drive too much rivet material into the hole.

While the tapered tail rivet has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

This tapered tail rivet is useful for joining structures together and, in particular, aircraft structures.

We claim:

1. A rivet for joining two or more structural elements having a specific total thickness, together, the rivet having a head portion; and a shank portion, the shank portion having a tolerance providing a minimum and a maximum allowable diameter and a nominal diameter therebetween and further having a specific length, the rivet providing a controlled expansion of a hole where the hole has an allowable minimum diameter equal to the maximum shank diameter and an allowable maximum diameter of 1.05 times the minimum shank diameter, the rivet comprising:
   a conical tapered tail portion having the following dimensions:
      a distal end diameter of between 0.80 times the minimum shank diameter and 0.68 times the maximum shank diameter; and
      a tail lenght of between 1.30 times the minimum shank diameter and 1.10 times the maximum shank diameter.

2. The rivet as set forth in claim 1, wherein said specific length of said shank portion is selected such that said tapered tail portion extends from between the end of the hole to a maximum depth therein of one-third of the specific total thickness of the structural elements.

3. The rivet of claim 2 wherein said head portion is a flush head.

4. The rivet of claim 2 wherein said head portion is a protruding head.

* * * * *

UNITED STATES PATENT AND TRADEMARK OFFICE
CERTIFICATE OF CORRECTION

PATENT NO.   :   4,749,323
DATED        :   June 7, 1988
INVENTOR(S)  :   Kenneth P. Sparling et al.

It is certified that error appears in the above—identified patent and that said Letters Patent is hereby corrected as shown below:

TITLE SHOULD BE:   HOLE EXPANDING RIVET WITH A SHAPED TAIL.

Signed and Sealed this

Fourth Day of October, 1988

Attest:

DONALD J. QUIGG

*Attesting Officer*     *Commissioner of Patents and Trademarks*